United States Patent
Gehring et al.

(10) Patent No.: US 6,427,960 B1
(45) Date of Patent: Aug. 6, 2002

(54) CONTAINER HOLDING ASSEMBLY

(75) Inventors: Thomas F. J. Gehring, Scarborough; Dejan Havidic, Toronto, both of (CA)

(73) Assignee: Collins & Aikman Products Co., Troy, MI (US)

( * ) Notice: Subject to any disclaimer, the term of this patent is extended or adjusted under 35 U.S.C. 154(b) by 41 days.

(21) Appl. No.: 09/680,744

(22) Filed: Oct. 6, 2000

(51) Int. Cl.⁷ .................................. A47K 1/08

(52) U.S. Cl. ................. 248/311.2; 224/926; 248/284.1; 248/309.1; 297/188.14

(58) Field of Search .......................... 248/311.2, 311.3, 248/309.1, 314, 315, 316.3, 316.5; 224/282, 284.1, 926; 297/188.14, 188.17, 188.16

(56) References Cited

U.S. PATENT DOCUMENTS

| | | | |
|---|---|---|---|
| 2,649,270 A | | 8/1953 | Franks |
| 5,014,956 A | | 5/1991 | Kayali ..................... 248/311.2 |
| 5,096,152 A | | 3/1992 | Christiansen et al. .... 248/311.2 |
| 5,190,259 A | | 3/1993 | Okazaki .................. 248/311.2 |
| 5,238,211 A | * | 8/1993 | Borovski ................. 248/311.2 |
| 5,280,848 A | * | 1/1994 | Moore ..................... 224/282 |
| 5,342,009 A | | 8/1994 | Lehner .................... 248/311.2 |
| 5,379,978 A | | 1/1995 | Patel et al. ............. 248/311.2 |
| 5,427,447 A | | 6/1995 | Satoh ..................... 312/309 |
| 5,505,417 A | * | 4/1996 | Plocher .................. 248/311.2 |
| 5,620,228 A | | 4/1997 | Ito et al. ................ 297/188.17 |
| 5,628,486 A | | 5/1997 | Rossman et al. ........ 247/311.2 |
| 5,671,877 A | * | 9/1997 | Yabuya ................... 224/282 |
| 5,692,718 A | | 12/1997 | Bieck ..................... 248/311.2 |
| 5,845,888 A | | 12/1998 | Anderson ............... 248/311.2 |
| 6,019,334 A | * | 2/2000 | Shinomiya ............... 248/311.2 |
| 6,036,152 A | * | 3/2000 | Hiscox et al. ........... 248/311.2 |
| 6,095,471 A | * | 8/2000 | Huang .................... 248/311.2 |

FOREIGN PATENT DOCUMENTS

| | | | |
|---|---|---|---|
| DE | 4224700 | | 1/1994 |
| GB | 2345681 | | 7/2000 |
| JP | 8-142732 | * | 8/1996 |
| JP | 8-142761 | * | 8/1996 |
| JP | 10-217824 | | 8/1998 |

OTHER PUBLICATIONS

International Search Report, International Application No. PCT/US01/31155.

* cited by examiner

Primary Examiner—Leslie A. Braun
Assistant Examiner—Tan Le
(74) Attorney, Agent, or Firm—Myers Bigel Sibley & Sajovec

(57) ABSTRACT

The container holding assembly includes a base defining a planar surface. The container holding assembly also includes a lid which is pivotally secured to the base at a pivot point offset from the base. A stabilizing arm is connected to the lid. The stabilizing arm is movable between a retracted position when the lid is in a closed position and a stabilizing position when the lid is in an open position. The stabilizing arm includes two back ends which move through slots defined by protrusions extending out from the interior surface of the lid. The container holding assembly also includes a linkage which extends between the stabilizing arm and the pivot point. The linkage orients the stabilizing arm when the back ends of the stabilizing arm transit the slots secured to the lid. A bale arm is pivotally secured to the linkage. The bill arm includes an extension and a container receiving arm. The bale arm prevents the lid from moving out of the open position when the container receiving arm receives a container thereon. The container receiving arm extends between two extensions of the bale arm and is not secured to any other structure. To rings in the base have slots. The slots received the container receiving arm therein when the container receiving arm abuts the base preventing the container receiving arm from sliding along the base.

7 Claims, 3 Drawing Sheets

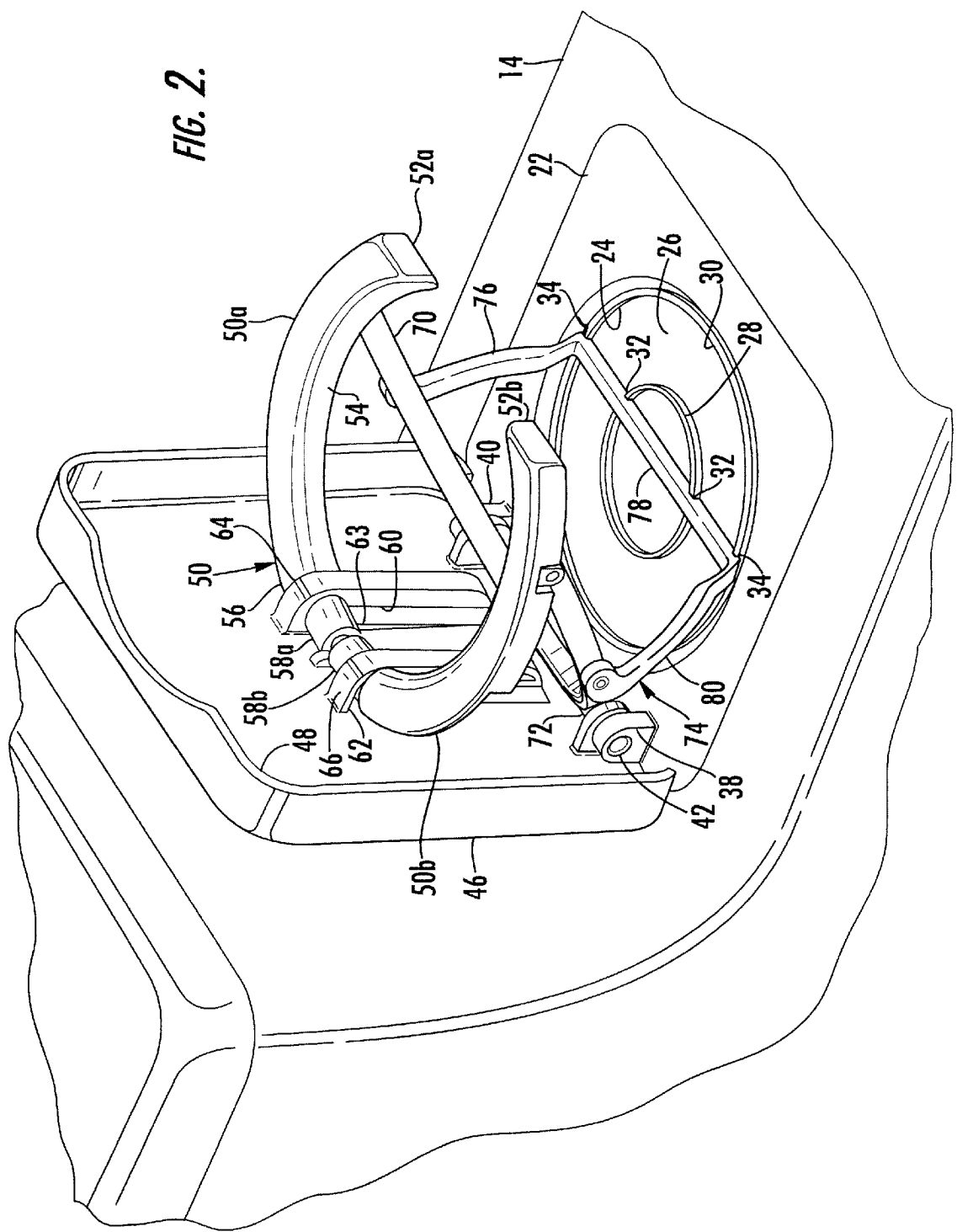

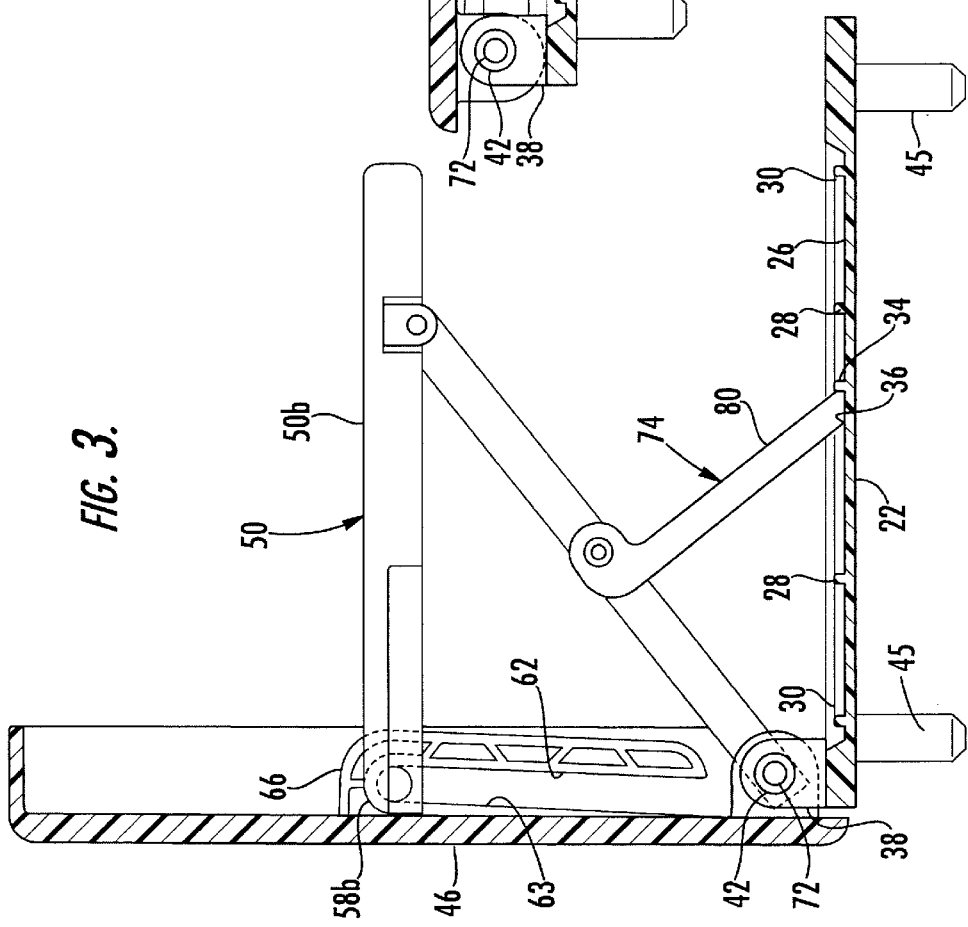

CONTAINER HOLDING ASSEMBLY

BACKGROUND ART

1. Field of the Invention

The invention relates to a container holding assembly for a motor vehicle. More specifically, the invention relates to a container holding assembly having a pivotal lid.

2. Description of the Related Art

Container holding assemblies in motor vehicles are installed in every imaginable position in the passenger compartment thereof. This is partly due to the addition of other components and, in some instances, the desire to create a cockpit affect resulting in the clustering of components near each other. A non-exhaustive list of operating components that may be found in the passenger compartment include a parking brake, transmission shift lever, window controls, coin holders, compartment doors, ashtrays and the like. A disadvantage develops as the container holding is placed adjacent or in close proximity to these operating components. More specifically, as the space surrounding the container holding assembly becomes more congested, the more likely it will be that someone or something may come in contact with the lid of the container holding assembly, or the container itself, resulting in the collapsing of the container holding assembly and the spilling of the contents of the container.

U.S. Pat. No. 5,692,718, issued to Bieck on Dec. 2, 1997, discloses a container holding device. The container holding device is a tray-type assembly and is movable between a retracted position and an extended position. A return member prevents the tray from being accidentally returned to its retracted position while it is holding a container. The return member would not adequately prevent a lid that pivots to a position perpendicular to its base.

SUMMARY OF THE INVENTION

A container holding assembly includes a base defining a planar surface and a pivot point disposed relative thereto. The container holding assembly also includes a lid that is pivotally secured to the base at the pivot point. The lid is movable between a closed position covering the base and an open position providing access to the base. A stabilizing arm is connected to the lid. The stabilizing arm is movable between a retracted position when the lid is in the closed position and a stabilizing position when the lid is in the open position. The stabilizing arm stabilizes a container when the container is placed on the base. A linkage extends between the stabilizing arm and the pivot point orienting the stabilizing arm when in each of the retracted and stabilizing positions. A bale arm is pivotally secured to the linkage. The bale arm includes an extension and a container receiving arm. The bale arm prevents or locks the lid in the open position when the container receiving arm receives the container thereon.

The advantage associated with the invention is the ability to provide a stable container holding assembly in a congested environment. More specifically, the container holding assembly includes the bale arm which allows the user of the container holding assembly to use the container holding assembly with the confidence of having a container or cup held by the container holding assembly without the risk of tipping the container or cup by inadvertently hitting the lid out of its open position. This is an important feature because spilled containers provide unwanted distractions and affect the cleanliness of the passenger compartment as well as the clothing of the passengers.

BRIEF DESCRIPTION OF THE DRAWINGS

Other advantages of the invention will be readily appreciated as the same becomes better understood by reference to the following detailed description when considered in connection with the accompanying drawings, wherein:

FIG. 2 is a perspective view of one embodiment of the invention;

FIG. 3 is a cross-sectional side view of one embodiment of the invention shown in a use position; and FIG. 4 is a cross-sectional side view of one embodiment of the invention shown in a storage position.

DETAILED DESCRIPTION OF THE PREFERRED EMBODIMENT

Figure 1:
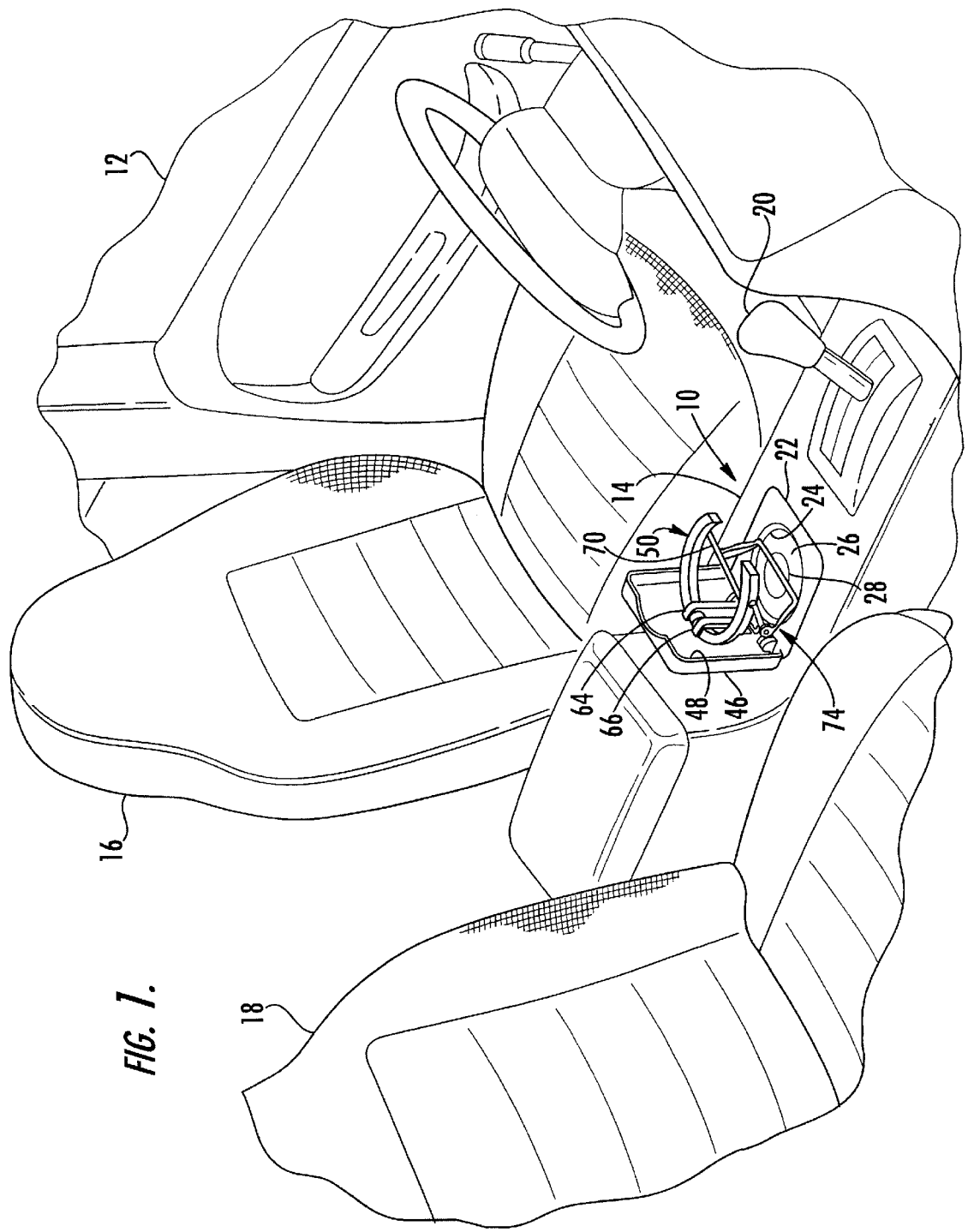
FIG. 1 perspective view of one embodiment of the invention shown in a passenger compartment, partially cut away, of an automotive vehicle.

Referring to FIG. 1, a container holding assembly ("cup holder") is generally indicated at 10. The cup holder 10 is located in a passenger compartment 12 of a motor vehicle (not shown). The cup holder 10 is shown to be mounted to a console 14 between a driver seat 16 and a passenger seat 18. A transmission shift lever 20 extends out of the console 14 at a position disposed adjacent the cup holder 10. It should be appreciated by those skilled in the art that the cup holder 10 may be positioned anywhere within the passenger compartment 12 so long as it is capable of functioning.

Referring to FIGS. 1 and 2, the cup holder 10 includes a base 22 that is mountable to a structure. As shown in the Figures, the structure is the console 14. The base 22 defines a recess 24 for receiving a bottom of a cup or container (not shown) therein. The recess 24 defines a bottom surface 26 that includes two rings 28, 30 extending up therefrom. These rings 28, 30 are anti-tipping rings that prevent the cup from tipping by preventing the bottom of the cup or container ("cup") from slipping along the bottom surface 26 of the recess 24. Each of the rings 28, 30 have two cuts 32, 34. The cuts 32, 34 define a channel 36 which will be discussed in greater detail subsequently. Extending up from the base 22 are two posts 38, 40. Each of the posts 38, 40 define a hole 42, 44. The holes 42, 44 are coaxial and define a pivot point. The pivot point is set up from and disposed relative to the base 22. Mounting flanges 45 are used to mount the base 22 to the console 14.

Pivotally secured to the base 22 is a lid 46. The lid 46 is pivotally secured to the base 22 at the pivot point. The lid 46 is movable between a closed position covering the base 22 and an open position providing access to the base 22. A peripheral lip 48 extends around the lid 46 covering the entire mechanism of the cup holder 10 when the lid 46 is in the closed position.

A stabilizing arm 50 is connected to the lid 46. The stabilizing arm 50 is movable between a retracted position when the lid 46 is in its closed position and a stabilizing position when the lid 46 is in its open position. The stabilizing arm 50 stabilizes the cup that is placed on the base 22. In the embodiment shown in the Figures, the stabilizing arm 50 has two halves 50a, 50b. The two halves 50a, 50b are arcuate in shape and each extends out to a distal end 52a, 52b. The distal ends 52a, 52b do not meet allowing for odd-shaped cups or cups with handles which will be held by the cup holder 10. While not shown, the stabilizing arm 50 may include rubber spacers along an interior surface 54 of the stabilizing arm 50 to provide for adjustment in cups of different dimensions.

A middle section, generally indicated at 56, of the stabilizing arm 50 is retained in a position of close proximity to the lid 46. As is shown, the middle section 56 may include two back ends 58*a*, 58*b*, each of which being the end of one of the halves 50*a*, 50*b* of the stabilizing arm 50. The back ends 58*a*, 58*b* move inside two slots 60, 62 that are defined by protrusions 64, 66 which extend out from an interior surface 68 of the lid 46. The slots 60, 62 are generally parallel to the interior surface 68. A ramp surface 63 forces the back ends 58*a*, 58*b* away from the lid 46 as they travel up the slots 60, 62. The protrusions 64, 66 have a honeycomb structure reducing the weight thereof. The slots 60, 62 are open-ended at a lower end thereof allowing for the removal of the back ends 58*a*, 58*b*. The removal of the back ends 58*a*, 58*b* would only be required during maintenance and would not be required during the normal operation of the cup holder 10.

A linkage 70 extends between the stabilizing arm 50 and the pivot point defined by the holes 42, 44 in the posts 38, 40. The linkage 70 orients the stabilizing arm 50 when the stabilizing arm 50 moves between its retracted and stabilizing positions. The stabilizing arm 50, linkage 70 and lid 46 move with respect to each other as the lid 46 moves between its open and closed positions. The linkage 70 is U-shaped with a linkage base 72 fixedly secured to and extending tangentially out from the base of the linkage 70. The two ends of the linkage base 72 are received by the holes 42, 44 allowing the linkage 70 to pivot about the linkage base 72.

The cup holder 10 includes a bale arm, generally indicated at 74. The bale arm 74 is secured to the linkage 70. The bale arm 74 includes an extension 76 and a container receiving arm 78. The bale arm 74 is pivotally secured to the linkage 70. Although not shown, the bale arm 74 is spring biased such that it would rest up against the linkage 70. When the lid 46 is moved to its open position perpendicular to the base 22, a cup being received through the stabilizing arm 50 will force the bale arm 74 downwardly due to the weight of the cup on the container receiving arm 78. The container receiving arm 78 stops when it abuts the bottom surface 26 of the base 22 after a cup is placed within the cup holder 10. The container receiving arm 78 will not move along the bottom surface 26 because the container receiving arm 78 will be received within the channel 36 defined by the two cuts 32,34 in the rings 28,30. Therefore, when the container receiving arm 78 is received within the two cuts 32, 34, the bale arm 74 prevents the accidental movement of the lid 46 out of the open position. In other words, the container receiving arm 78 locks the position of the lid 46, stabilizing arm 50 and the linkage 70 with respect to each other, thus providing a stable and protected area to place a cup within the passenger compartment 12 of the motor vehicle. Similar to the linkage, the bale arm 74 is U-shaped including the extension 76, a second extension 80 and the container receiving arm 78 extending therebetween.

We claim:

1. A container holding assembly comprising:

a base defining a planar surface and a pivot point disposed relative thereto;

a lid pivotally secured to said base at said pivot point movable between a closed position covering said base and an open position providing access to said base;

a stabilizing arm connected to said lid, said stabilizing arm movable between a retracted position when said lid is in said closed position and a stabilizing position when said lid is in said open position, said stabilizing arm stabilizing a container when the container is placed on said base;

a linkage pivotally connected to said stabilizing arm and to said pivot point orienting said stabilizing arm when in each of said retracted and stabilizing positions; and a bale arm pivotally secured to said linkage, said bale arm including an extension and container receiving arm, said bale arm preventing (locking) said lid in said open position when container receiving arm receives the container thereon.

2. A container holding assembly as set forth in claim 1 wherein said base includes a channel for holding said container receiving arm from sliding along said base when said container holding assembly is holding the container.

3. A container holding assembly as set forth in claim 2 wherein said bale arm includes a second extension such that said container receiving arm extends between said extension and said second extension.

4. A container holding assembly as set forth in claim 3 wherein said base includes an anti-tipping ring defining said channel.

5. A container holding assembly as set forth in claim 4 wherein said stabilizing arm includes two arcuate arms.

6. A container holding assembly as set forth in claim 5 wherein said lid includes two slots defining paths for said arcuate arms to pass when said stabilizing arm is moving between said retracted and stabilizing positions.

7. A container holding assembly as set forth in claim 6 wherein said base includes a recess for receiving the container therein.

* * * * *